United States Patent [19]

Jurewicz et al.

[11] Patent Number: 5,437,163
[45] Date of Patent: Aug. 1, 1995

[54] METHOD OF LOGGING DATA IN A TRANSPORT REFRIGERATION UNIT

[75] Inventors: Romuald M. Jurewicz, St. Louis Park, Minn.; Arthur A. Anderson, Vandegrift, Pa.

[73] Assignee: Thermo King Corporation, Minneapolis, Minn.

[21] Appl. No.: 293,616

[22] Filed: Aug. 22, 1994

[51] Int. Cl.$^6$ .............................................. F25B 49/02
[52] U.S. Cl. ....................................... 62/126; 62/130; 364/557
[58] Field of Search .................. 62/125, 126, 127, 128, 62/129, 130, 155, 234; 340/584, 585, 588, 589, 870.16, 870.17; 364/557; 374/186

[56] References Cited

U.S. PATENT DOCUMENTS

| | | | |
|---|---|---|---|
| 4,882,564 | 11/1989 | Monroe et al. | 340/585 X |
| 4,949,550 | 8/1990 | Hanson | 62/127 X |
| 4,970,496 | 11/1990 | Kirkpatrick | 340/588 X |
| 5,123,252 | 6/1992 | Hanson | 62/89 |
| 5,123,253 | 6/1992 | Hanson et al. | 62/89 |
| 5,140,825 | 8/1992 | Hanson et al. | 62/89 |
| 5,140,826 | 8/1992 | Hanson et al. | 62/115 |
| 5,172,561 | 12/1992 | Hanson et al. | 62/127 |
| 5,181,389 | 1/1993 | Hanson et al. | 62/126 |

*Primary Examiner*—Harry B. Tanner

[57] ABSTRACT

A method of logging data relative to the operation of a transport refrigeration unit, during each trip of the transport refrigeration unit, with the transport refrigeration unit including control means and non-volatile memory means. The method includes the steps of monitoring a plurality of predetermined variables of the transport refrigeration unit to provide data, and selecting those variables of the plurality of monitored variables whose data is to be logged in the memory means during a trip of the transport refrigeration unit. The method further includes the steps of dividing the non-volatile memory means into at least first and second data segments for storing data from the selected variables, storing an address pointer in the first data segment which points to an address in the second data segment, for each trip of the transport refrigeration unit, and storing data from the selected variables in the second data segment, during each trip of the transport refrigeration unit. The method also includes the step of downloading data stored in the non-volatile memory means to a predetermined device, using at least one address pointer stored in the first data segment to download associated data stored in the second data segment.

17 Claims, 8 Drawing Sheets

EVENT ENTRIES TO DATA ARRAY

| | DEFINITION OF ENTRY | EVENT DESCRIPTOR BYTE (168) | | | | | | | | | LENGTH OF DATA FIELD (170) | | | | | | | | DATA FIELD (174) |
|---|---|---|---|---|---|---|---|---|---|---|---|---|---|---|---|---|---|---|---|
| | | MSB | | | | | | | LSB | MSB | | | | | | | | LSB | |
| 182 | TEXT HEADER | 0 | 0 | 0 | 0 | 0 | 0 | 0 | 0 | 0 | VARIABLE | | | | | | | 0 | TEXT |
| 184 | START OF TRIP HEADER | 0 | 0 | 0 | 0 | 0 | 0 | 0 | 1 | 0 | VARIABLE | | | | | | | 0 | CONTROL WORDS |
| 186 | FRAME HEADER | 0 | 0 | 0 | 0 | 0 | 0 | 1 | 0 | 0 | VARIABLE | | | | | | | 0 | CONTROL WORDS |
| 187 | CONTROL WORD UPDATE | 0 | 0 | 0 | 0 | 0 | 0 | 1 | 1 | 0 | VARIABLE | | | | | | | 0 | CONTROL WORDS |
| 188 | REAL TIME CLOCK UPDATE | 0 | 0 | 0 | 0 | 0 | 1 | 0 | 0 | 1 | 0 | 0 | 0 | 0 | 0 | 0 | 0 | 0 | 0 |
| 190 | ASCII TEXT | 0 | 0 | 0 | 0 | 0 | 1 | 0 | 1 | * | VARIABLE | | | | | | | 0 | TEXT |
| 192 | UPDATE OF VARIABLE LIST | 0 | 0 | 0 | 0 | 0 | 1 | 1 | 0 | * | VARIABLE | | | | | | | 0 | MODIFICATION OF V.L. |
| 194 | ASYNCHRONOUS LOG OF IDENTIFIED ITEMS | 0 | 0 | 0 | 0 | 0 | 1 | 1 | 1 | * | VARIABLE | | | | | | | 0 | I.D. OF ITEMS TO LOG |
| 196 | ASYNCHRONOUS LOGGING OF V.L. | 0 | 0 | 0 | 0 | 1 | 0 | 0 | 0 | 1 | 0 | 0 | 0 | 0 | 0 | 0 | 0 | 1 | 1 WORD |
| 198 | POWER UP | 0 | 0 | 0 | 0 | 1 | 0 | 0 | 1 | * | VARIABLE | | | | | | | 0 | CONTROL WORDS & ALARMS |
| 199 | PRE-TRIP | 0 | 0 | 0 | 0 | 1 | 0 | 1 | 0 | * | VARIABLE | | | | | | | 0 | TYPE OF PRE-TRIP |
| 200 | DEFROST | 0 | 0 | 0 | 0 | 1 | 0 | 1 | 1 | * | VARIABLE | | | | | | | 0 | ENTERED/EXITED |
| 201 | ALARM | 0 | 0 | 0 | 0 | 1 | 1 | 0 | 0 | * | VARIABLE | | | | | | | 0 | ALARM IDENTIFICATION |

* { 1 = VARIABLE LIST (V.L.) APPENDED
    0 = V.L. NOT APPENDED }

FIG. 6

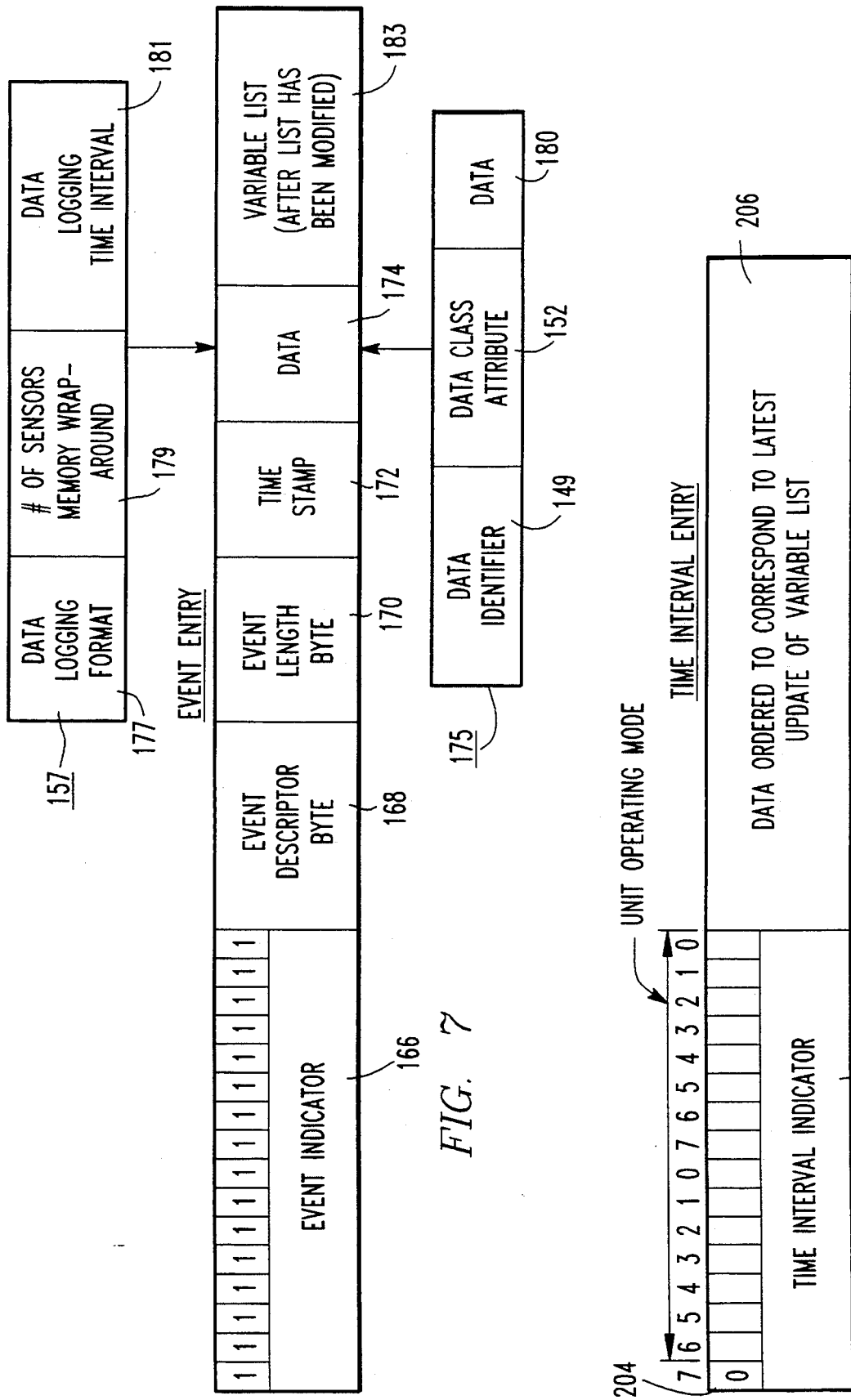

METHOD OF LOGGING DATA IN A TRANSPORT REFRIGERATION UNIT

TECHNICAL FIELD

The invention relates in general to data logging, and more specifically to a method of logging data relative to the operation of a transport refrigeration unit.

BACKGROUND ART

U.S. application Ser. Nos. 08/010,092 and 08/010,081, filed Jan. 27, 1993, both of which are assigned to the same assignee as the present application, disclose a data management system for transport refrigeration units, such as refrigeration units for straight trucks, tractor-trailer units, containers, and the like. The disclosed data management system has distributed control and a communications protocol which is particularly suited for accurately exchanging large amounts of data between the nodes of the communication system.

One of the nodes illustrated in the above mentioned patent applications is a data logger node which stores information relative to predetermined variables during the operation of an associated transport refrigeration unit. If would be desirable, and it is an object of the invention, to provide a new and improved method of logging such operational data which facilitates retrieval of the information in various formats, including data relative to a specific trip of the transport refrigeration unit, and data relative to all of the trips having information stored in the data logger. The various formats should also include the ability to segregate and retrieve only synchronous data, ie., data stored at predetermined timed intervals, as well as to segregate and retrieve only asynchronous data, ie., data stored as a result of non-scheduled or randomly occurring events.

SUMMARY OF THE INVENTION

Briefly, the present invention includes a method of logging data relative to the operation of a transport refrigeration unit, during each trip of the transport refrigeration unit, with the transport refrigeration unit including control means and non-volatile memory means. The method includes the steps of monitoring a plurality of predetermined variables of the transport refrigeration unit to provide data, and selecting those variables of the plurality of monitored variables whose data is to be logged in the memory means during a specific trip of the transport refrigeration unit. The method divides the non-volatile memory means into at least first and second data segments for storing data from the selected variables. An address pointer is stored in the first data segment which points to an address in the second data segment, for each trip of the transport refrigeration unit. Data from the selected variables is stored in the second data segment, during each trip of the transport refrigeration unit, with the data being stored starting at the address of the second data segment pointed to by the associated address pointer in the first data segment. The method further includes the step of downloading data stored in the non-volatile memory means to a predetermined device, using one or more of the address pointers stored in the first data segment to download associated data stored in the second data segment.

In a preferred embodiment of the invention, the step of selecting variables whose data is to be logged during a trip of the transport refrigeration unit includes the steps of providing a generic list of all of the plurality of monitored variables, indicating which of the variables in the generic list are to have their associated data logged during the trip, marking the generic list to identify the indicated variables, and preparing a variable list from the marked generic list which includes only the variables whose data is to be logged. The step of storing data in this embodiment stores data relative to the variables in the variable list.

In another embodiment of the invention, the method includes the step of providing a data base which is shared by a plurality of predetermined control elements of the transport refrigeration unit, with the step of providing a generic list of all of the plurality of monitored variables including the step of storing the generic list in the shared data base, and the step of preparing a variable list from the generic list also includes the step of storing the variable list in the shared data base.

In still another embodiment of the invention, the step of monitoring a plurality of predetermined variables includes the step of monitoring variables which are always present for time interval recording, ie., they provide a continuous signal, output or voltage during the operation of the transport refrigeration unit which may be monitored and recorded. The step of monitoring a plurality of predetermined variables also includes the step of monitoring variables which provide data randomly as the result of occurrences of predetermined unscheduled events during the operation of the transport refrigeration unit. The step of storing data stores data synchronously from all selected variables which have a continuous output, ie., at predetermined timed intervals. The step of storing data stores data asynchronously from a selected variable which provides unscheduled data, ie., the data is stored at the time the unscheduled data is provided. In a preferred embodiment, a preamble of each new timed data entry, and a preamble of each new unscheduled event data entry, identify whether the associated data is synchronous data or asynchronous data. Unscheduled events are stored by a time stamped event related entry format which includes an initial event identifying indicator. Time interval data is stored via a non-time stamped entry format which includes an initial time interval identifying indicator which distinguishes it from an event identifying indicator. The time interval indicator is followed by synchronous data.

BRIEF DESCRIPTION OF THE DRAWINGS

The invention will become more apparent by reading the following detailed description in conjunction with the drawings, which are shown by way of example only, wherein:

FIG. 6 is a chart which illustrates the elements of a message entered into the data array of the data logging apparatus shown in FIGS. 1, 2 and 3 for non-scheduled or randomly occurring events, which provides data entries asynchronously to the data logging memory;

FIG. 7 illustrates a time stamped header and message format of the event entries shown in FIG. 6, prepared according to the teachings of the invention;

FIG. 8 illustrates a message format of time interval entries into the data array of the data logging apparatus shown in FIGS. 1, 2 and 3, which logs data synchronously from predetermined variables of the variable list at predetermined time intervals.

DESCRIPTION OF PREFERRED EMBODIMENTS

Figure 1:
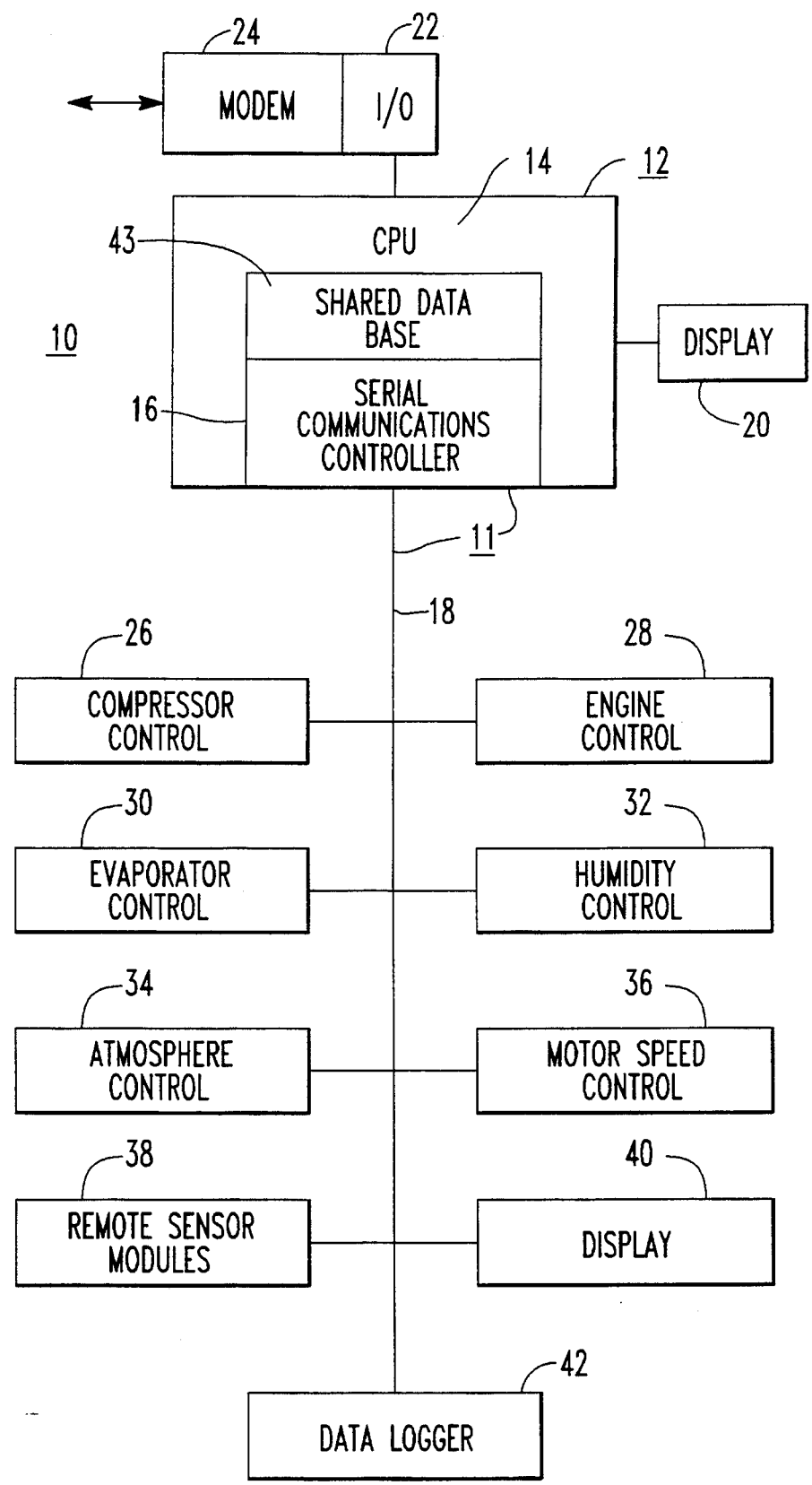
FIG. 1 is a block diagram of a transport refrigeration unit having distributed control which includes data logging apparatus which may utilize the methods of the invention.
Figure 2:
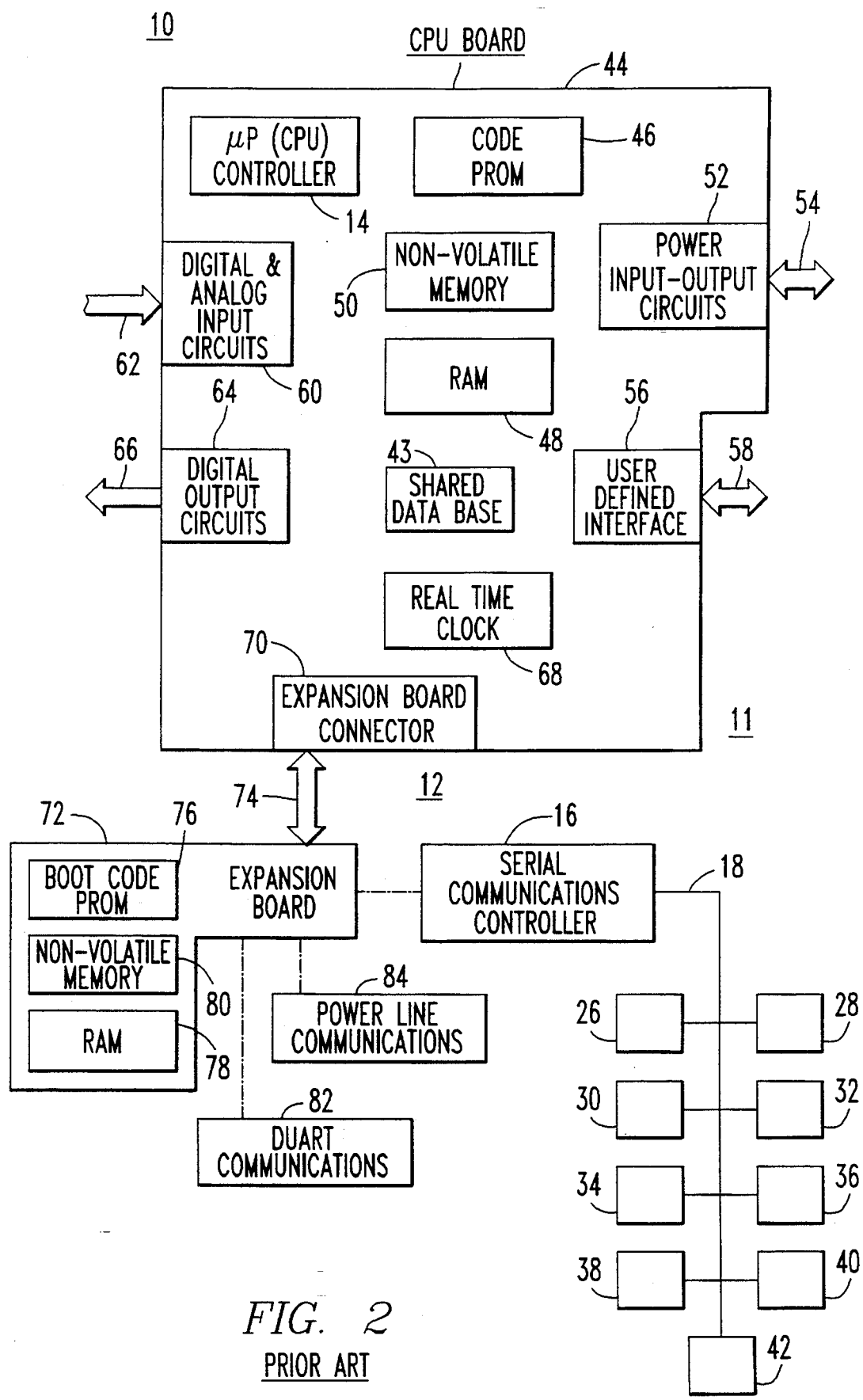
FIG. 2 is a block diagram of the transport refrigeration unit shown in FIG. 1 which illustrates a central processing microcontroller of a central control node in detail.
Figure 3:
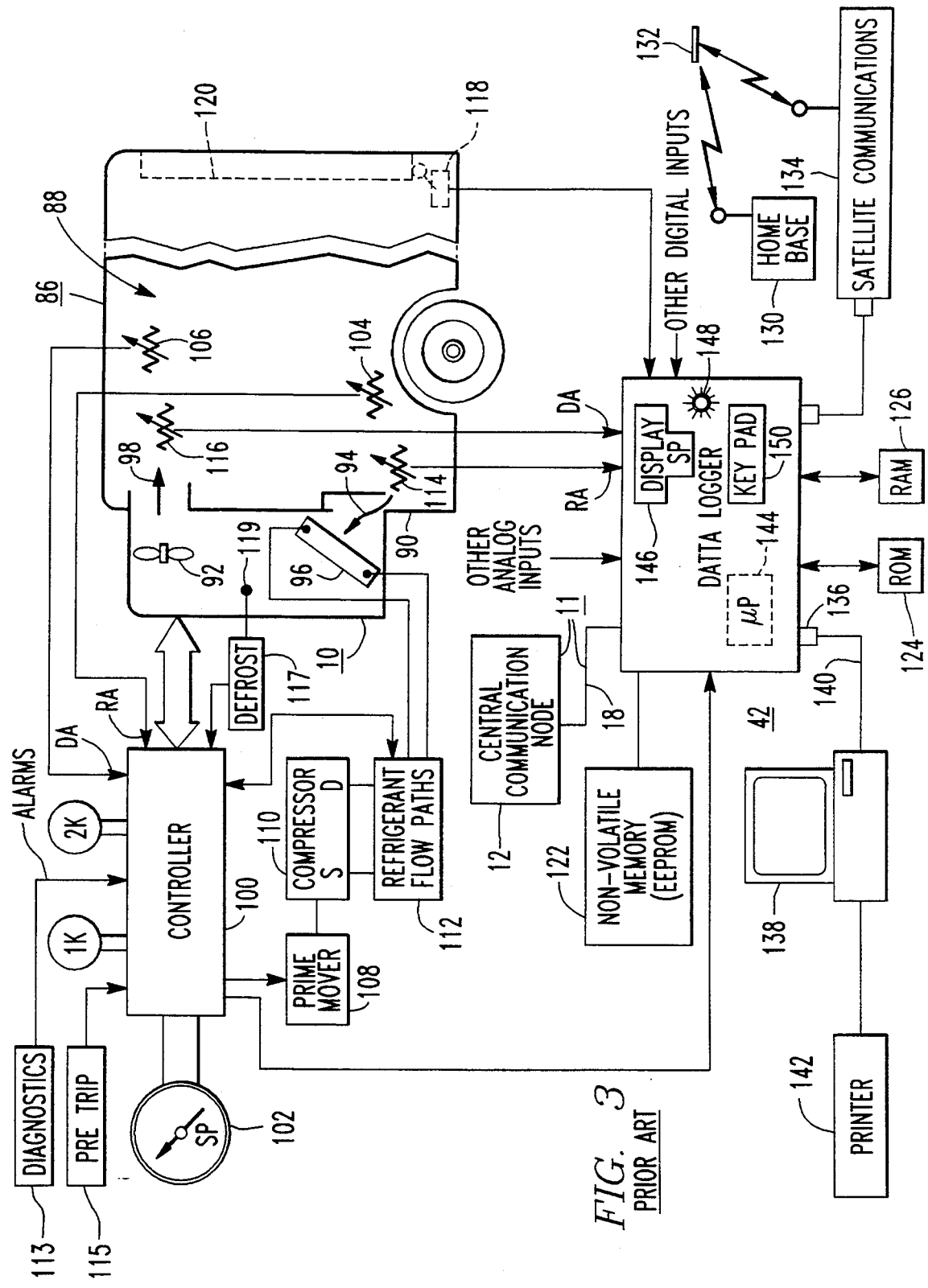
FIG. 3 is a schematic diagram of the transport refrigeration unit shown in FIGS. 1 and 2, illustrating the data logging apparatus in greater detail.

Referring now to the drawings, FIGS. 1, 2 and 3 illustrate prior art transport refrigeration unit and control arrangements which may utilize the teachings of the invention. FIGS. 1 and 2 are similar to figures in the hereinbefore mentioned patent application Ser. Nos. 08/010,092 and 08/010,081, respectively, and FIG. 3 is similar in part to a figure in co-pending application Ser. No. 08/239,492, filed May 9, 1994, which is assigned to the same assignee as the present application.

More specifically, FIG. 1 illustrates a block diagram of a transport refrigeration unit 10 having a data management system 11 of the type which may utilize the methods of the invention. Refrigeration unit 10 includes a central data communication node 12 having a microprocessor, such as Intel's 80C196KB, which includes a central processing unit microcontroller 14, hereinafter called CPU 14. The central communication node 12 further includes a serial communications controller 16, such as Intel's 82526, which is connected to a serial communications bus 18, such as a twisted pair, or a coaxial or fiber optic cable. In addition to serial bus 18, central communication node 12 may be connected to a local display 20, and to remote monitoring devices via electrical power lines, radio transmitters, and the like, via an input output board (I/O) 22 and a modem 24.

Examples of remote communication nodes which may be connected to the serial communications bus 18 include a refrigerant compressor controller 26; a compressor prime mover engine controller 28; a refrigerant evaporator controller 30; a conditioned load humidity controller 32; a conditioned load atmosphere controller 34; an engine or motor speed controller 36, such as a compressor prime mover, and fan and blower motors; remote sensor modules 38, such as temperature, humidity, atmosphere, pressure, and speed sensors; a display 40, and data logger apparatus 42. The data logger apparatus 42 may access the central communication node 12 via serial communications bus 18, as illustrated, or directly via a serial port associated with the CPU 14. The methods of the invention are directed in general to the data logger apparatus 42, and also to the use of data logger apparatus 42 in the distributed type of control data management system illustrated. The distributed control arrangement illustrated also utilizes a shared or global data base 43, accessible by the various communication nodes.

As hereinbefore stated, transport refrigeration units are used on trucks, trailers and containers, with each having different electrical and electronic optional features available, including remote monitoring of the unit via satellite communications, remote monitoring of the unit via power line, and the like. In the exemplary embodiment of transport refrigeration unit 10 shown in FIG. 2, basic functions applicable to all types of transport refrigeration units are provided on a printed circuit board 44, hereinafter called CPU board 44, which includes the hereinbefore mentioned CPU 14.

CPU board 44 also includes a code socket for receiving a programmable read-only memory (PROM) 46 which stores code providing operating instructions. PROM 46 may be an erasable PROM (EPROM), an electrically erasable PROM (EEPROM), or a flash EPROM which permits electrical erasing while the memory device is installed. CPU board 44 further includes a socket for a random access memory (RAM) 48 for storing flags and other variables which are generated during the operation of unit according to the instructions stored in code PROM 46, and a socket for an erasable non-volatile memory 50, preferably a flash PROM, such as for storing data log information. While the shared data base 43 may be resident on the non-volatile memory 50, it is illustrated as a separate block in FIG. 2, as it may be on a different non-volatile memory chip, as desired.

CPU board 44 includes power input-output circuits 52 and a power connector 54; user-defined interface circuits 56 which communicate with such devices as display 20 and an associated keyboard via a connector 58; digital and analog input circuits 60 which receive contact closure signals from switches as well as analog inputs from sensors via connectors shown generally at 62; digital output circuits 64 such as for providing TTL outputs via a connector 66 for driving relays and other power switching devices; a real time clock 68, such as for time stamping data entries; and an expansion board connector 70. Expansion board connector 70 enables application specific expansion printed circuit boards, such as an expansion board 72, to be directly connected to CPU board 44, with the direct plug-in connection being indicated generally at 74.

Expansion board 72, for example, may include expanded code, indicated generally as boot code PROM 76, a random access memory (RAM) 78, and additional non-volatile memory 80, such as for additional data log memory space. Expansion board 72 may also implement communication interfaces, such as the hereinbefore described serial communications controller 16 and its associated serial data communications bus 18, a DUART communications device 82 for monitoring unit 10 via radio, including satellite communications; and power line communications apparatus 84, such as for monitoring unit 10 via terminal and shipboard wiring.

FIG. 3 illustrates transport refrigeration unit 10 and data logger apparatus 42 in detail. Transport refrigeration unit 10 is associated with a truck, trailer, container, and the like, hereinafter referred to generally as vehicle 86. Vehicle 86 defines a space 88 to be conditioned or served by unit 10. Transport refrigeration unit 10, which may be mounted on a wall 90 of vehicle 86, for example, includes an evaporator fan or blower 92. Fan or blower 92 draws air, called "return air" and indicated by arrow 94, from conditioned space 88, and through an evaporator coil or heat exchanger 96. The resulting conditioned air, called "discharge air" and indicated by arrow 98, is discharged back into conditioned space 88.

Refrigeration valves and other control devices associated with transport refrigeration unit 10 are controlled by control means 100, eg., a thermostat or controller, hereinafter called controller 100. Controller 100 has a set point temperature selector 102 which is used to select the desired set point temperature SP of conditioned space 88. Controller 100 has inputs for receiving a signal RA from a return air temperature sensor 104 and a signal DA from a discharge air temperature sensor 106. In response to either the DA or RA signals, or both, controller 100 controls a relay 1K to select either cooling or heating modes, as required to hold the temperature of conditioned space 88 in a predetermined range adjacent to the selected set point temperature SP; and a relay 2K which selects the speed of a prime mover 108, such as a diesel engine, which is connected to drive a refrigerant compressor 110. Compressor 110 has discharge and suction ports D and S, respectively, which are connected to refrigerant flow paths of unit 10, shown generally at 112, with the hereinbefore mentioned evaporator coil 96 also being connected in the refrigerant flow paths, as is well known in the art.

Controller 100 includes one or more diagnostic programs 113 which monitor the operation of transport refrigeration unit 10 and provide alarm codes which identify the type of alarm generated. U.S. Pat. Nos. 5,123,252; 5,123,253; 5,140,825; and 5,140,826, which are assigned to the same assignee as the present application, disclose diagnostic programs which generate alarm codes, and these U.S. Patents are hereby incorporated into the specification of the present application by reference.

Controller 100 includes a program, or programs, shown generally at 115, for performing pre-trip diagnostics which locate faults in unit 10 before unit 10 initiates a trip. U.S. Pat. No. 5,172,561, which is assigned to the same assignee as the present application, describes pre-trip programs which may be used, and this U.S. Patent is hereby incorporated into the specification of the present application by reference.

Controller 100 further includes defrost control 117 which detects when evaporator coil 96 should be defrosted to remove ice build up. Defrost control 117 may simply include a timer which initiates defrost at predetermined time intervals, or defrost control 117 may be of the type which detects an actual need to defrost coil 96, such as by detecting a predetermined reduction in air flow through evaporator coil 96 via an air flow detector 119, and the like.

Data logger 42 is connected to return air and discharge air temperature sensors 114 and 116, which provide temperature signals RA and DA similar to those provided to controller 100. Depending upon the type of transport refrigeration unit 10, one or more additional analog inputs may be connected to data logger apparatus 42, such as: additional temperature sensors when unit 10 has more than one conditioned space; a humidity sensor which senses the humidity of the air conditioned space; a sensor which detects atmosphere concentration, when a special atmosphere is contained in conditioned space 88; an ambient air temperature sensor; and the like. Digital inputs may also be provided to data logger apparatus 42, such as: an input from a door switch 118 which detects the position of a door 120 which controls access to conditioned space 88; inputs from switches connected to sense the position of any additional door or doors to conditioned space 88; inputs which indicate the presence or absence of a voltage on certain control conductors in controller 100, such as to detect defrost operation, cooling and heating modes, the speed mode of prime mover 108, and inputs which indicate various alarm conditions which may occur during the operation of transport refrigeration unit 10, and the like.

Data logger apparatus 42 may communicate with central communications node 12 via serial communications bus 18, or directly to a serial port, as desired. Data logger apparatus 42 includes non-volatile memory 122, preferably a flash PROM, for storing data relative to the operation of transport refrigeration unit 10, a read-only memory (ROM) 124 for operational code, a random-access memory 126 for variables generated during the running of application programs, a port 128 for over-the-road monitoring of transport refrigeration unit 10 by a home base 130 via a satellite 132 and associated satellite communications apparatus 134, and a port 136 for downloading information from memory 122 to a predetermined device such as a personal computer 138 via a serial connector 140. A printer 142 for providing printed reports relative to trips made by transport refrigeration unit 10 may be connected to computer 138, or it may be connected directly to serial port 136, as desired.

Data logger apparatus 42 includes a microprocessor 144, similar to CPU 14 used by the data management system 11, a display 146 which includes a visual indicator 148 which may be flashed to indicate the presence of an alarm condition, and a key pad 150 for interactive communication between data logger apparatus 42 and a user.

Figure 4:
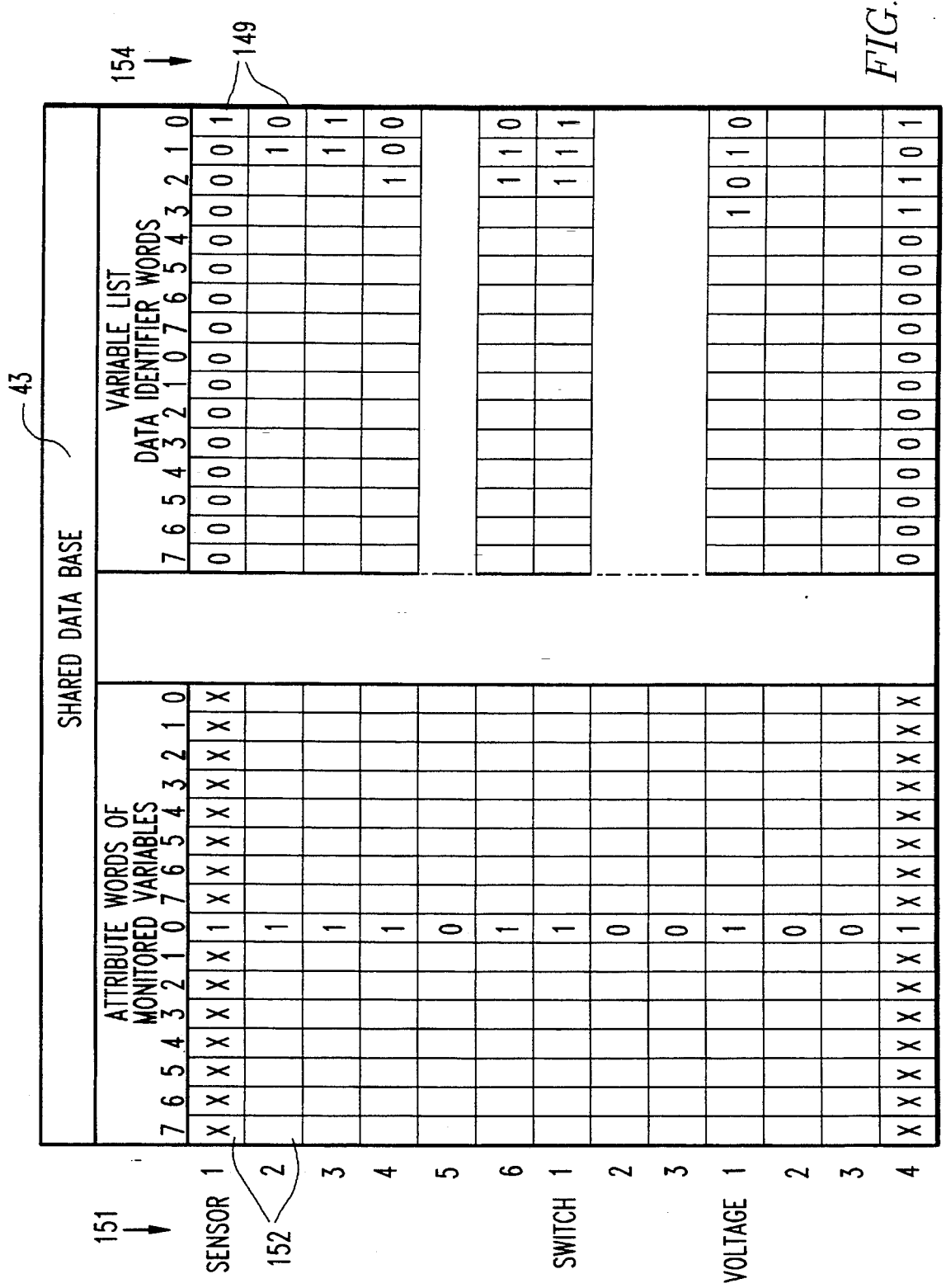
FIG. 4 is a chart which illustrates a generic list of attribute words associated with the plurality of variables that are monitored and thus possible to log data from during the operation of the transport refrigeration unit shown in FIGS. 1, 2 and 3, and a variable list of those variables selected from the generic list to have their associated data stored during a specific trip of the transport refrigeration unit.

FIG. 4 is a chart which illustrates an aspect of the invention wherein all of the variables that are monitored in unit 10, such as by sensors, switches, voltage levels, alarms, and the like, are identified with an unique digital identifier word consisting of two 8-bit bytes, called a data identifier word 149, and the shared data base 43 has a generic list 151 of all such data identifier words. To add a new monitored variable to transport refrigeration system which is not in the generic list 151, it is only necessary to add the new data identifier word to the shared data base 43. The new data identifier word 149 may be added to the shared data base 43 in a manner similar to that used when a new communication node identifies itself to the shared data base 43 with its unique class and member identifier, as described in the hereinbefore mentioned co-pending application Ser. No. 08/010,092.

Shared data base 43 also maintains a bit-mapped attribute word 152, consisting of two 8-bit bytes, for each of the data identifier words 149. Each bit of each attribute word 152 functions as an independent flag, with a software data manager utilizing the attribute words to insure the integrity and security of the shared data base 43. For example, one bit is used as a flag which provides a read-only privilege to the data, ie., the data may not be changed or modified by an external communication node. Another flag provides full read and write access, allowing a communication node to report variable sensor data as well as being able to retrieve other data for local processing. Still another flag indicates which data is eligible for transmission and update via the serial communications bus 18. For example, data with this bit set is transmitted from shared data base 43 by the central communication node 12 over bus 18 on a regular basis and is available to all connected communication nodes. Another flag is used to indicate whether or not the data has changed since the last access by broadcast message on bus 18. When the data is modified, this flag is set by the communication node sending the data, and when it is broadcast on bus 18 by the central communication node 12 it is reset by the data manager of the shared data base 43 Thus, data transmission is minimized by limiting global broadcasts on bus 18 to that data which has changed since the last global broadcast.

Still another flag of each attribute word 152, which will be assumed to be bit 0 of the higher order byte of the attribute word 152, is used to indicate which data is to be logged by data logger apparatus 42 during a trip of transport refrigeration unit 10. Thus, the operator of transport refrigeration unit 10 can select which data should be stored, and which data should be ignored, from all of the variables being monitored. This feature eliminates the storing of data which is of little or no interest during any specific trip of transport refrigeration unit 10. The non-volatile memory 122 has only a defined amount of data storage space, and thus it is not desirable to fill the data storage space with data which is of no interest during a specific trip. Thus, at the start of a trip, the person in charge of data to be stored during the trip enters the data identifier of each variable whose data is to be stored during the trip. In response thereto, CPU 14 sets bit 0 of the higher order byte of the associated attribute word, to indicate that the data of this variable is to be stored. From one trip to the next, it is only necessary to indicate the changes from the last trip.

In the chart of FIG. 4 a left-hand vertical column lists examples of the monitored variables which are in generic list 151, including for purposes of example, six different sensors, three different switches, and four different voltages. The sensors include return air, discharge air and ambient air temperature sensors, humidity sensors, engine RPM sensors, and the like. The switches include access door switches, and the voltages include control voltages which indicate whether unit 10 is in defrost, whether unit 10 is in a cooling or a heating mode, whether prime mover 108 is in a high or low speed, and the like. In addition to these items, alarms which may be generated by diagnostic programs 113 and controller 100 during operation of unit 10 are also provided for by an alarm event entry. The alarm event entry includes a data field for storing a digital code which identifies the type of alarm which caused the alarm event entry to be prepared, as will be hereinafter explained when describing event entries in detail relative to FIG. 6.

The digital attribute words 152 associated with the variables listed in the generic list 151 along the left-hand side of the chart shown in FIG. 4 are shown in a vertical left-hand column. The generic list 151, in addition to attribute words 152 also includes a data identifier word 149 along with each attribute word 152. For purposes of example, it is assumed that data from sensors 1, 2, 3, 4 and 6, switch 1, and voltages 1 and 4 are selected to be stored during the present trip of unit 10, and bit 0 of the higher order byte of each of their associated attribute words 152 is set to a logic 1. CPU 14 prepares a list of all variables selected for recording during the trip, called a variable list 154, which list includes the data identifier words of the selected variables. The variable list of data identifier words is shown in a right hand column in FIG. 4. Certain of the variables in variable list 154, such as the closing or opening of switch 1, and the presence or absence of voltage at the monitored points of the controller 100, will be recorded asynchronously via an appropriate time stamped event entry, with the time stamping including the value of the real time clock 68 at the time the unscheduled "event" occurred, in like manner to the generation of an alarm event entry which records an alarm condition detected and signaled by diagnostic programs 113 and controller 100. Other variables in variable list 154 are appropriately marked for time interval recording, such as by using another flag bit of attribute word 152, eg., the inputs from sensors 1, 2, 3, 4 and 6 will be marked for time interval recording and thus recorded synchronously at predetermined time intervals. The value of the time interval is selected by authorized personnel at the start of a trip of unit 10. Exemplary selectable time intervals include 2, 5, 10, 15 and 30 minutes, and 1, 2, 4, 8, 12 and 24 hours, but other time intervals may be used. The selected time interval is identified with a unique digital code stored in a control word, or words, as will be hereinafter explained.

Figure 5:
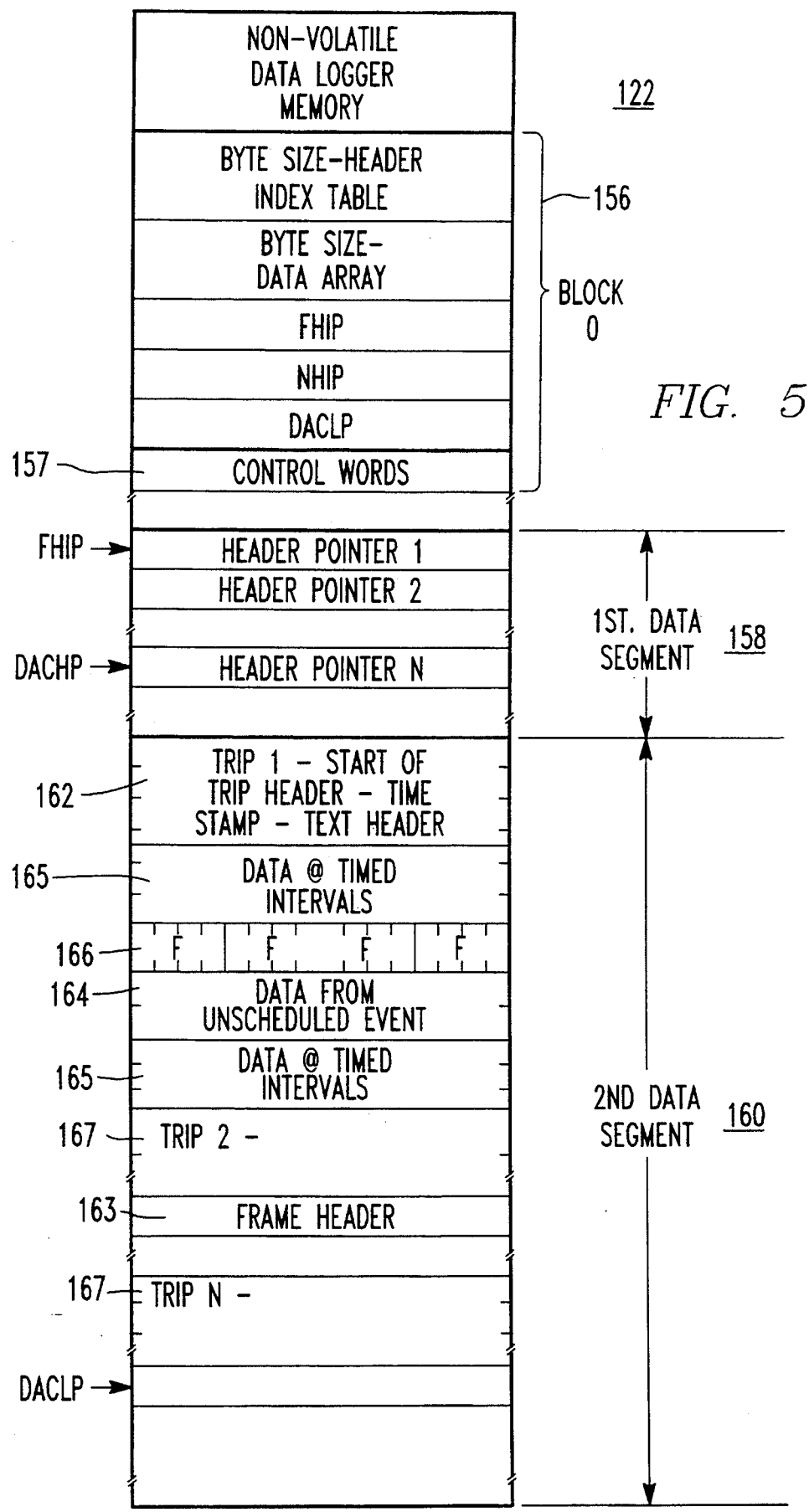
FIG. 5 is a chart which illustrates a method of dividing non-volatile data logging memory of the data logging apparatus shown in FIGS. 1, 2 and 3, into memory blocks and data segments, according to the teachings of the invention.

In order to retrieve data stored in non-volatile data logging memory 122 in various user selectable formats, the non-volatile memory reserved for data logging purposes is divided into data blocks each containing a predetermined number of bytes, such as 128 ($80_{60}$) bytes. FIG. 5 illustrates memory 122 and its arrangement according to the methods of the invention.

More specifically, block 0 of memory 122, indicated at 156, includes status, pointer and control word information for data logger apparatus 42. The remaining portion of memory 122 reserved for data logging data is divided into first and second data segments 158 and 160. The first data segment 158 will also be called header index table 158. The second data segment 160 will also be called ring queue data array 160, or simply data array 160. Header index table 158 is used to point to header entry information within data array 160, eg., start-of-trip headers, text headers, and frame headers. Frame headers are inserted into the data array 160 at predetermined uniform spacings to allow data wrap-around and write-over of the oldest trip, when memory wrap-around is enabled. Header index table 158 does not point to other types of event related entries, or to time interval data entries, to data array 160. This arrangement enables the header index table 158 to access data array 160 on a highly flexible trip selection basis, enabling the selection of both event entries and time interval entries, or a specified one of either. Data array 160 stores both event driven data entries, eg., unscheduled events, and time interval driven data entries. The header index table 158 and data array 160 are on the 128 byte block boundaries.

Among other things, block 0 stores the byte sizes of header index table 158 and of data array 160, and certain address pointers. One of the pointers, pointer FHIP, is a first header index pointer, and it lists the address of the oldest header, and thus the start of the oldest trip, in data array 160. Pointer NHIP indicates the number of headers stored in data array 160, starting with pointer FHIP. Since header count indicated by NHIP includes frame headers, the number of frame headers in the count is subtracted from the header count when determining the number of trips stored in data array 160. Each header has a digital type code called an event descriptor byte which enables the different non-trip initiating headers to be distinguished from a header which initiates a new trip. The last header pointer which points to the start of the current trip in data array 160 may be considered to be the data array current header pointer DACHP, which is shown associated with an arrow pointing to the header for trip N in FIG. 5. Address pointer DACLP points to the next location to be written to in data array 160, and is thus the current location pointer of data array 160.

Block 0 of data array 160 also contains one or more control words 157, with two control words being used for purposes of example. Control words 157 include a data field which contains a digital code which identifies the value of the time interval which should be used to record time interval data. A predetermined value of this data field, such as $0000_{16}$, disables time interval recording, and in this case only events will be recorded. Control words 157 may also include additional information relative to the operation of data logger 42, including the number of sensors, and whether or not the memory wrap-around feature is enabled or disabled.

As hereinbefore stated, the header index table 158 store address pointers to each header entry in data array 160. At the start of each trip a start-of-trip header is entered into data array 160. As the data space of data array 160 is filled with data, a frame header 163 is inserted into data array 160 each time about 10% of the data logger memory space allocated in data array 160 is used up. The FHIP will usually point to the first start-of-trip header entry. However, in the event that all of the data space of data array 160 is exhausted, and data wrap-around is enabled, the address pointed to by FHIP is advanced to the address of the next adjacent frame header 163, freeing 10% of the data space containing the oldest data for storing of new data, over-writing the old data. When FHIP is advanced to a frame header 163, the header information from the original location of FHIP is advanced to the new location of FHIP. In this manner, a frame header will be recognized as a header which starts a new trip. Trip number 1 is indicated at 162 in FIG. 5, with data array 160 for trip number 1 including a start-of-trip header, a time stamp from real time clock 68 indicating the minute, hour and date of the start of the trip, and a text header which introduces information in the form of text that authorized personnel desire to be included in an associated downloading of information relative to the trip.

Trip number 1, indicated at 162 in FIG. 5 also includes two types of data entries, ie., event driven data entries and time driven event entries. Data entries related to data stored at the predetermined time intervals, ie., synchronous data, is indicated at 165. Time interval entries 165 are not time stamped, as their entry time is known from the time interval value. Event driven data entries include time stamped system information such as start-of-trip headers, text headers, frame headers, alarm entries, and other monitored unscheduled data from variables on the variable list 154, including data relative to the running of pre-trip programs 115, entries which signal when defrost is initiated and terminated by defrost control 117, and an entry which indicates when control words 157 are updated. Such events occur at random intervals and each includes a time stamp. When data relative to an unscheduled event is entered into data array 160 the bits of a preamble word (two 8-bit bytes) of the event header entry is set to a predetermined unique value, such as all ones ($FFFF_{16}$). This unique preamble value is used to distinguish event entries from time interval entries, as time interval entries have a preamble which excludes $FFFF_{16}$. For example, similarly located preamble word of a time interval entry always has at least one bit which is a logic zero, to insure that a time interval entry does not inadvertently and falsely indicate an unscheduled event entry. Thus, an operator may request a report of all unscheduled events in any selected trip, or trips, of unit 10, or request all time interval data, or both, as desired, increasing the flexibility in the printing of only information desired. The entry of an unscheduled event is shown in FIG. 5 during trip number 1 at 164, with the $FFFF_{16}$ preamble of the unscheduled event being shown at 166. Data 165 from time interval entries is continued to be stored after the unscheduled event 164. While not shown in FIG. 5, the time interval entries 165 have an identifying preamble which, as hereinbefore stated, is not $FFFF_{16}$. As indicated at 167, other trips of unit 10 are continued to be stored in data array 160, with the pointer DACLP pointing to the next address location that data should be stored to during the current trip.

Event entries to data array 160 are listed in a chart shown in FIG. 6, and message formats for an event entry to data array 160 are shown in FIG. 7. As illustrated in FIG. 7, an event indicator preamble 166 is illustrated at the start of the entry, which is set to the exemplary $FFFF_{16}$. The event indicator preamble 166 is followed by an event descriptor byte 168. As illustrated in FIG. 6, each event has its own unique digital identifier, and thus CPU 14 is informed of the type of event being logged. The event descriptor byte 168 is followed by an event length byte 170. The event length byte 170 indicates the number of words, each of which have two 8-bit bytes, in the data field of the associated event.

As illustrated in FIG. 7, a time stamp 172 follows the event length byte 170, with the time stamp 172 being an input from real-time clock 68, which input indicates the current time in seconds, minutes, hours, day, month, and year. A data field 174 follows the time stamp 172.

Certain types of event entries include the control words 157 in data field 174, and other types of event entries include a data format 175 in data field 174. As illustrated in FIG. 7, a suitable format for control words 157 includes a byte 177 reserved for indicating and identifying different data logger formats, a byte which indicates the number of sensors, and whether or not the data wrap-around feature is enabled, and a two byte word 181 which includes a digital code which identifies the selected time interval value in minutes for time interval recording of synchronous data.

The data field format 175 includes the data identifier word 149, in the format illustrated in chart column 154 of FIG. 4, the data class attribute word 152 which, as hereinbefore described, indicates the security level of the node providing the data, as well as having a flag set at the appropriate bit location of the word which indicates an update of the data from this node. The attribute word 152 is then followed by a data portion 180 of the data field 174. Certain event entries are always followed by an update entry of data from the variable list 154, while other event entries optionally have data from the variable list 154 appended to the end of the event entry. Such optional appending of the variable list 154 is shown at 183 in FIG. 7.

The chart in FIG. 6 illustrates in detail the different event entries to the data array 160. A text header, indicated at 182, is entered into data array 160 through serial bus 18, or a direct serial input channel, using a write data log header command. The event length field of text header 182 is variable, depending upon the amount of text desired. The first two words of the data field 174 of the text header 182 are interpreted by CPU 14 as it contains control words 157. The control words are obtained from block 0 of memory 122. As hereinbefore stated, and illustrated in FIG. 7, control words 157 include the selection of the time interval at which synchronous data from certain variables in the variable list 154 are to be periodically logged.

A start-of-trip header 184 is entered into data array 160 through bus 18, or a direct serial channel, via a start of trip command; or by activation of a hardware start-of-trip input on data logger apparatus 42. The start-of-trip header 184 contains two words in the data field, ie., the hereinbefore mentioned control words 157 which include the selected time interval for time interval recording.

A frame header 186 is entered into data array 160 each time data logger apparatus 42 uses about one-tenth of the available memory space in data array 160. As hereinbefore stated, frame headers 186 are used to advance a start-of-trip header 184 when wrap-around of data array 160 occurs, and data wrap-around is enabled. Similar to the start-of-trip header 184, frame header 186 includes only control words 157 in its data field, which include the latest selection of the time interval value to be used for time interval recording.

A change in the control words 157 of block 0, eg., such as a change in the record time interval, instead of requiring a new start-of-trip header 184 or a text header 186, may be made directly by using an asynchronous control word update event entry 187. The data field includes the updated control words 157. The data field of variable list 154 is appended to this entry.

A real time clock update entry 188 is entered into data array 160 to modify the time interval logging time base. The time base may be changed by an operator of unit 10, and also along with the next scheduled time interval log following the noon and midnight hours. There is no data field associated with the real time clock update, but the data field of variable list 154 may be appended when time driven recording is enabled, as the clock update entry 188 re-establishes the time base for all time interval entries to follow.

An ASCII text entry 190 is entered into data array 160 when an operator wishes to introduce ASCII text. The length of the data field is variable, as it depends upon the length of the ASCII text entered. The MSB of the event length byte is set to logic 1 if the operator desires that the data field of variable list 154 be appended to the ASCII text entry.

An update of variable list entry 192 is entered into data array 160 whenever the variable list 154 is modified. This entry is always used following a text header entry 182, a start-of-trip header entry 184, and a frame header entry 186, as these headers introduce the latest time interval selected for time interval recording, ie., it re-establishes the time base for all time interval entries to follow. Entry 192 is also introduced into the data field as appended data when requested by certain of the MSB's of the event length byte, such as when the MSB of the event length byte of the ASCII text entry 190 is set, as hereinbefore described. The length of the update of variable list entry 192 is variable as it depends upon the number of variables listed. The data length field 170 indicates the number of variables to be logged at each time interval. The operator sets the most significant bit of event length byte 170 if the data field of the variable list 154 is to be appended to this entry.

A variable list item, or items, event 194 is entered into data array 160 whenever an item on the generic list 151, or on the variable list 154, must be logged asynchronous to the time interval events. In other words, a log of any item, or items, may be made upon demand, simply by using event entry 194 and identify the item, or items, to be logged immediately, ie., asynchronously. The length of the data field is variable, dependent upon the number of variables selected to be logged asynchronous to the time interval logging of data. Each item to be logged asynchronous to the time interval events is identified with the same format as used to identify the item in the shared data base 43. If the operator sets the MSB, the data field of the variable list 154 will be appended to this entry.

An asynchronous variable list data event 196 is entered into the data array whenever the variable list data field logged for time interval recording is requested to also be logged asynchronous to the time interval recording. In other words, when it is desired to log all of the time interval items on the variable list 154 upon demand, instead of waiting for the next time interval log thereof, such as during maintenance or trouble shooting of unit 10, event 196 is entered into data array 160. The log of the variable list 154 will then be made asynchronously, at the time of event entry 196, without changing the normal time interval recording of the time interval related items of the variable list 154. The data field of variable list 154 is always appended to this entry.

A power-up event entry 198 is entered into data array 160 whenever an initialization sequence of unit 10 is executed from a primary power-up mode. The length of the data field is variable. The data field 174 always includes control words 157, and, if any alarms are active, the data field will also include an identification code for each such alarm. The data field of variable list 154 related to time interval logging of data may be appended to this entry if time interval recording is enabled.

A pre-trip entry 199 is entered into data array 160 when pre-trip programs 115 are run. The data field 174 includes one word (2 bytes) which indicate the type of pre-trip, eg., short or long modes thereof, and whether or not the selected mode was successfully completed, ie., no faults detected. The data field of variable list 154 may be appended by setting the MSB of data length field 170.

A defrost entry 200 is entered whenever defrost control 117 initiates defrost of evaporator coil 96, and when defrost control 117 terminates defrost. A digital code in the data field 174 indicates which defrost event has occurred. A data field of variable list 154 may be appended by setting the MSB of data field length byte 170.

An alarm event entry 201 is entered into data array 160 whenever a selected alarm is generated by diagnostic programs 113 and controller 100, as alarms are logged asynchronous to the time interval events. An event descriptor byte having a value of 0000 1100 indicates an alarm event entry, as detected by diagnostic programs 113 and controller 100. The event length byte 170 is variable as it depends upon the number of alarm definitions included in the data field. Each digital value from $00_{16}$ up to and including $FF_{16}$ may be assigned to a identify a different type of alarm condition, with the alarm entry 201 including the digital definition value of each active alarm. Display 146 may also provide the identification code of each active alarm, and alarm indicator 148 is flashed when there is an active alarm. The data field of variable list 154 will be appended to the alarm entry 200 if desired by the programmer, by setting the MSB of event length byte 170.

Time driven entries to data array 160 are entries of data from the variables listed in the variable list 154 which are to be logged at the regular time interval value indicated by the control word in the latest event stored in data array 160 of the type which contains control word info, including the change-in-control word entry 187, a start-of-trip header 184, a text header 182 introduced after the trip has started, a power-up entry 198, or a frame header 186 which points to the oldest trip following a data wrap-around of data array 160. Since time interval entries occur at preselected intervals, a time stamp is not required and thus not provided for such entries. The information entered into data array 160 is ordered to correspond to the latest variable list update entry event 192.

Since event entries have a unique identifying preamble word, eg., $FFFF_{16}$, the similarly located preamble word of a time interval entry must have an identifying preamble word having a range which is pre-defined to exclude $FFFF_{16}$. FIG. 8 illustrates the initial message position of a preamble word 202 for a time interval entry into the data array 160. As illustrated, the MSB of the higher order byte of the word is always set to logic zero, as indicated at 204. In a preferred embodiment, preamble word 202 also is used to convey certain information relative to the operation of unit 10. For example, preamble word 202 may be bit mapped, having fields containing digital codes which identify the present operating state and present mode of unit 10. For example, different digital values of predetermined bits are assigned to indicate cool; null; heat; defrost; different operating states, including pump-down and shutdown; different operating modes, including normal, pre-trip and power off; suction line modulation on; compressor on, the controlling temperature sensor, and the like. Data, ordered to correspond to the latest update of variable list 154, as provided in entry 192, is appended to the preamble 202 as indicated at 206.

Data is entered and extracted from non-volatile memory 122 of data logger apparatus 42 through function calls, which take control until the function is completed. For purposes of example, Intel's C programming language IC-96 is selected as primary language of the data logging apparatus 42 for making such function calls. As hereinbefore stated, three types of inputs to memory 122 may occur, initialization, unscheduled event entries, and scheduled time interval entries. The initialization function in C programming language calling convention is:

status_byte=DLOG_INIT_INPUT

The C programming language calling convention for creating the variable list 154, ie., update of variable list entry 192, is:

status_byte=DLOG_CREATE_GDT_VARLIST (buffer_address, buffer_page)

The updated variable list 154 is created by scanning the shared data base 43. For example, the shared data base 43 may be scanned in the order of the data identifier words, starting with the smallest digital value, and picking out the data identifier words which have bit 0, of the higher order byte of the attribute word associated with the data identifier, set.

Unscheduled event entries to memory 122 are provided by the C programming language calling convention:

status_byte=DLOG_UNSCHEDULED_SUB (buffer_address, buffer_page)

Scheduled inputs, ie., time interval entries to memory 122, are provided by the C programming language calling convention:

status_byte=DLOG_SCHEDULED_SUB

The disclosed methods enable data to be retrieved from data logger memory 122 in many different formats, as requested by the retriever. For example, all of the data in data array 160 may be retrieved, when it is desirable to obtain all of the data relative to all of the trips stored in memory 122. Another format is to retrieve time interval entries only, which would necessarily include certain types of event entries related to time interval entries, including text header entries 182, start-of-trip header entries 184, frame header entries 186, real time clock update entries 188 and power-up entries 198. Another format is to retrieve event entries only, of the type not related to time interval entries, such as alarms, opening and closing of access doors to conditioned space 88, changes in the operating mode of unit 10, and the like.

To retrieve all of the data from memory 122 in the data array 160, the C programming language calling convention is:

status_word=DLOG_FULL_RETRIEVE_SUB (options, block-number, buffer_address, buffer_page)

To retrieve single trip data the data blocks associated with the requested trip are retrieved, using the C programming calling convention:

status_word=DLOG_TRIP_RETRIEVE_SUB (trip_number, buffer_address, buffer_page)

A single entry retrieval interface is provided to retrieve individual entries for examination by the data base management system. This gives the data base management system the ability to create different data logging record formats, such as those described above. Each format may be constructed by obtaining information from memory 122 on a per-entry basis. In other words, this function provides sequential information from memory 122 through multiple function calls. The C language calling convention for retrieving single entry information is:

status_word=DLOG_ENTRY_RETRIEVE_SUB (structure_address, structure_page)

Since sequential information is being provided, the address of the structure must remain the same for the complete retrieval. The initial call is distinguished from successive calls by indicating the start of a new record. This allows the data logging system to initialize its single entry retrieval parameters. The trip number entry should only be initiated at the start of a new record. The value $0000_{16}$, for example, is equivalent to beginning at trip 1. If the full data logging retrieval option is selected, ie., retrieval of all trips, each text header event or start of trip header event retrieved will update the current trip number. Options such as full trip, event entries disabled, and time entries disabled, may be changed, if desired after the initial call. For example, trips from a first number to a second number may be obtained by selecting full retrieval at the first number, switching to trip retrieval when the second trip number is encountered.

Figure 9:
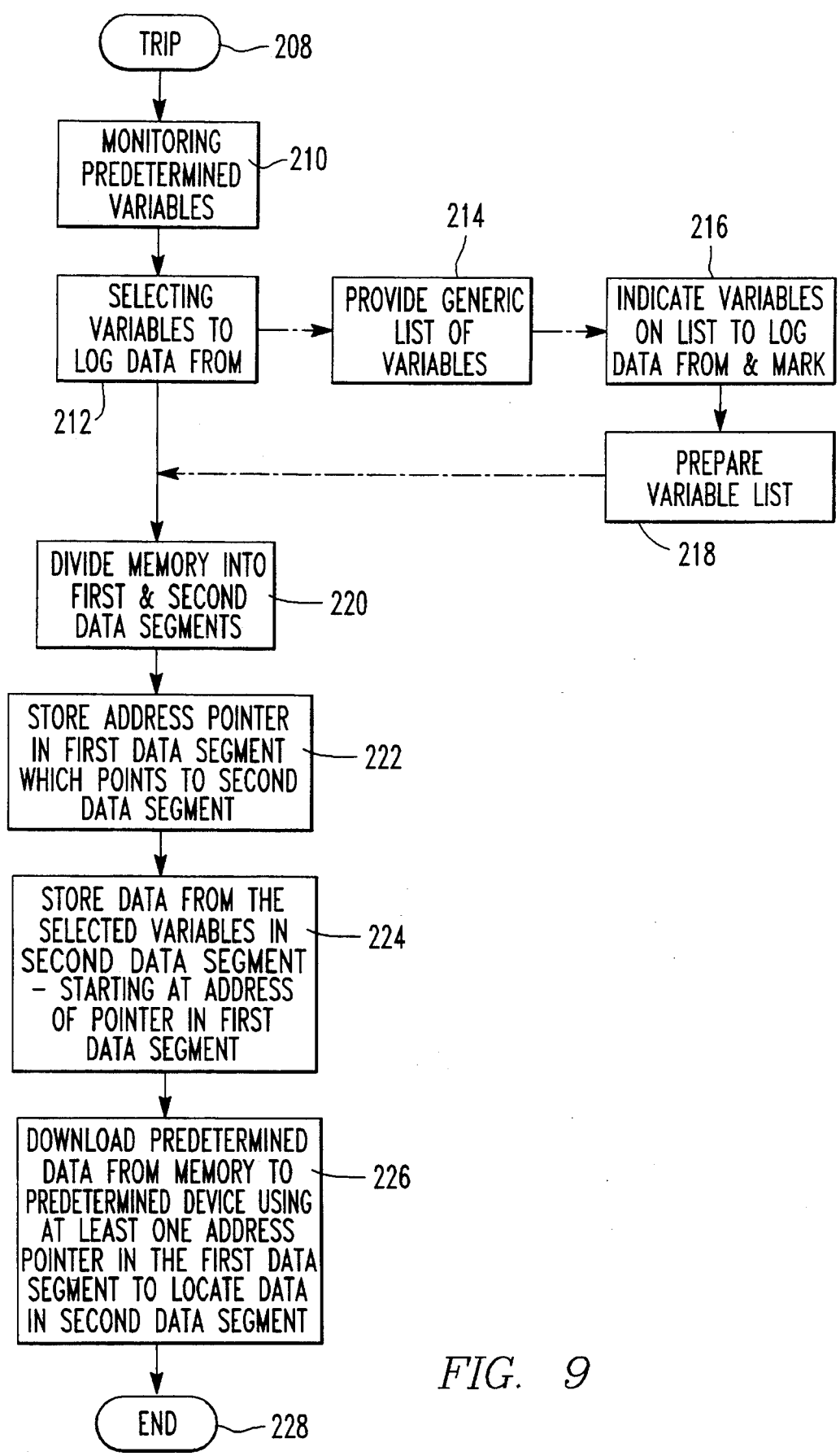
FIG. 9 is a block diagram which illustrates certain basic method steps of the invention.

FIG. 9 summarizes the basic steps of the method disclosed in FIGS. 4–8, with the start of a trip being indicated at 208. Step 210 monitors predetermined variables of the associated transport refrigeration unit. Step 212 selects those variables, from all of the variables being monitored, whose data is to be logged during the associated trip. A preferred implementation of step 212 includes the step 214 which provides the generic list 151 of all of the monitored variables, step 216 indicates and marks those variables whose data is to be logged, and step 218 prepares the variable list 154. Step 220 divides the data space of the data log memory 122 into first and second data segments 158 and 160. Step 222 stores an address pointer in the first data segment 158 which points to an address in the second data segment 160. Step 224 stores data from the selected variables in the second data segment 160, starting at the address of the associated pointer stored in the first data segment. Step 226 downloads predetermined data stored in memory 122 to a predetermined device, such as computer 138, using at least one address pointer stored in the first data segment 158 to locate the desired data stored in the second data segment 160. The end of the trip is indicated at 228.

We claim:

1. A method of logging data relative to the operation of a transport refrigeration unit, during each trip of the transport refrigeration unit, with the transport refrigeration unit including control means and non-volatile memory means, comprising the steps of:

monitoring a plurality of predetermined variables of the transport refrigeration unit to provide data, selecting those variables of the plurality of monitored variables whose data is to be logged in the memory means during a trip of the transport refrigeration unit, dividing the non-volatile memory means into at least first and second data segments for storing data from the selected variables, storing an address pointer in the first data segment which points to an address in the second data segment, for each trip of the transport refrigeration unit, storing data from the selected variables in the second data segment, during each trip of the transport refrigeration unit, said step of storing data including the step of starting the data stored in the second data segment at the address of the second data segment pointed to by the address pointer in the first data segment which is associated with the current trip of the transport refrigeration unit, and downloading data stored in the non-volatile memory means to a predetermined device, said downloading step including the step of using at least one address pointer stored in the first data segment to download associated data stored in the second data segment.

2. The method of claim 1 wherein the step of selecting variables whose data is to be logged during a trip of the transport refrigeration unit includes the steps of:

providing a generic list of all of the plurality of monitored variables, indicating which of the variables in the generic list are to have their associated data logged during the trip, and marking the generic list to identify the indicated variables.

3. The method of claim 2 including the step of preparing a variable list from the generic list which includes only the variables whose data is to be logged, with the step of storing data including the step of periodically storing data relative to variables in the variable list.

4. The method of claim 3 including the step of providing a data base which is shared by a plurality of predetermined control elements of the transport refrigeration unit, with the step of providing a generic list of all of the plurality of monitored variables including the step of storing the generic list in the shared data base, and wherein the step of preparing a variable list from the generic list includes the step of storing the variable list in the shared data base.

5. The method of claim 1 including the step of identifying the source of the data stored in the second data segment by the storing step, by associating data with the variable which produced it.

6. The method of claim 1 wherein the step of downloading data stored in the non-volatile memory means includes the steps of:

requesting the downloading of data logged during a specific trip of the transport refrigeration unit, and downloading only the data from the second data segment which was stored therein during the requested specific trip.

7. The method of claim 1 wherein the step of downloading data stored in the non-volatile memory means includes the step of requesting the downloading of data logged during all of the trips having an address pointer stored in the first data segment, and all of the data stored in the second data segment pointed to by the address pointers.

8. The method of claim 1 wherein the step of monitoring a plurality of predetermined variables includes the steps of:

monitoring variables which provide a continuous output during the operation of the transport refrigeration unit, and monitoring variables which provide data randomly as the result of predetermined unscheduled events during the operation of the transport refrigeration unit, with the step of storing data from all selected variables which have a continuous output storing such data synchronously at a predetermined time interval, and with the step of storing data from a selected variable which provides unscheduled data storing such data asynchronously, at the time the unscheduled data is provided by the variable.

9. The method of claim 8 including the step of identifying in a preamble of each new timed data entry and each new unscheduled event data entry whether the associated data is synchronous data or asynchronous data.

10. The method of claim 8 wherein the step of storing unscheduled data includes the step of providing an event entry format which includes the identifying preamble, an event descriptor code which indicates the type of event, and including the step of time stamping the event entry.

11. The method of claim 8 including the steps of:

providing a control word update entry which identifies the predetermined time interval, forming a control word update event entry which includes the control word, time stamping the control word update event entry, and entering the time stamped control word event header asynchronously in the second data segment.

12. The method of claim 8 including the step of generating an alarm in response to a predetermined malfunction of the transport refrigeration unit, with the step of monitoring variables which provide data randomly monitoring the generation of alarms, and wherein the step of storing unscheduled data asynchronously includes the steps of providing an alarm event entry, identifying the type of alarm in the alarm event entry, and time stamping the alarm event entry.

13. The method of claim 8 including the steps of providing a real time clock, and time stamping the storing of asynchronous data with time values provided by the real time clock.

14. The method of claim 13 including the steps of updating the real time clock, providing a real time clock update event entry, and storing the real time clock update event entry asynchronously in the second data segment.

15. The method of claim 1 wherein the step of selecting variables whose data is to be logged during a trip of the transport refrigeration unit includes the steps of:

providing a generic list of all of the plurality of monitored variables, indicating which of the variables in the generic list are to have their associated data logged during the trip, marking the generic list to identify the indicated variables, preparing a variable list from the generic list which includes only the variables whose data is to be logged, with the step of storing data including the step of periodically storing data relative to variables in the variable list, updating the variable list, preparing a variable list update event entry which includes the updated variable list, time stamping the variable list update event entry, and entering the time stamped variable list update event entry in the second data segment.

16. The method of claim 8 including the step of checking the transport refrigeration unit via pre-trip procedures, with the step of monitoring variables which provide data randomly monitoring the pre-trip procedure, and wherein the step of storing unscheduled data asynchronously includes the steps of providing a pre-trip event entry, providing information relative to the pre-trip procedure in the pre-trip event entry, and time stamping the pre-trip event entry.

17. The method of claim 8 including the steps of initiating and terminating a defrost procedure of the transport refrigeration unit, with the step of monitoring variables which provide data randomly monitoring the defrost procedure, and wherein the step of storing unscheduled data asynchronously includes the steps of providing a defrost event entry when the defrost procedure is initiated and providing a defrost event entry when the defrost procedure is terminated, and time stamping each of the defrost event entries.

* * * * *